US008542250B2

(12) United States Patent
Baseley et al.

(10) Patent No.: US 8,542,250 B2
(45) Date of Patent: Sep. 24, 2013

(54) ENTERTAINMENT DEVICE, SYSTEM, AND METHOD

(75) Inventors: Nathan James Baseley, London (GB); Nicolas Doucet, London (GB)

(73) Assignee: Sony Computer Entertainment Europe Limited (GB)

( * ) Notice: Subject to any disclaimer, the term of this patent is extended or adjusted under 35 U.S.C. 154(b) by 729 days.

(21) Appl. No.: 12/542,032

(22) Filed: Aug. 17, 2009

(65) Prior Publication Data
US 2010/0045869 A1 Feb. 25, 2010

(30) Foreign Application Priority Data
Aug. 19, 2008 (EP) ..................................... 08252736

(51) Int. Cl.
*G09G 5/12* (2006.01)
*G06T 19/00* (2011.01)

(52) U.S. Cl.
CPC ...................................... *G06T 19/00* (2013.01)
USPC ........... 345/633; 345/632; 345/629; 345/619; 345/419; 345/474

(58) Field of Classification Search
CPC ..................................................... G06T 19/00
USPC ................ 345/633, 632, 629, 619, 419, 630, 345/474
See application file for complete search history.

(56) References Cited

U.S. PATENT DOCUMENTS

2004/0104935 A1* 6/2004 Williamson et al. .......... 345/757
2004/0197750 A1* 10/2004 Donaher et al. .............. 434/236
2007/0133841 A1* 6/2007 Zhang et al. .................. 382/103
2010/0048290 A1* 2/2010 Baseley et al. ................. 463/25
2010/0302348 A1* 12/2010 Richards ........................ 348/36

FOREIGN PATENT DOCUMENTS
EP 1 672 470 6/2006

OTHER PUBLICATIONS

Immersive Authoring of Tangible Augmented Reality Applications, Gun A. Lee, Claudia Nelles, Mark Billinghurst, Gerard Jounghyun Kim Nov. 2004 ISMAR '04: Proceedings of the 3rd IEEE/ACM International Symposium on Mixed and Augmented Reality Publisher: IEEE Computer Society.*
European Search Report dated Mar. 5, 2009, from the corresponding European Application.

(Continued)

*Primary Examiner* — Javid A Amini
(74) *Attorney, Agent, or Firm* — Lerner, David, Littenberg, Krumholz & Mentlik, LLP

(57) ABSTRACT

An entertainment device for combining virtual images with real images captured by a video camera so as to generate augmented reality images. The device comprises receiving means operable to receive a sequence of video images from the video camera via a communications link. The device further comprises detecting means operable to detect an augmented reality marker within the received video images, and processing means operable to generate a virtual image plane in dependence upon the detection of the augmented reality marker by the detecting means. The virtual image plane is arranged to be substantially coplanar with a real surface upon which the augmented reality marker is placed so that virtual images may be generated with respect to the real surface. The processing means is operable to generate the virtual image plane within the captured video images such that the virtual image plane is defined with respect to the detected augmented reality marker, and the virtual image plane has an area which is greater than an area which corresponds to the augmented reality marker.

15 Claims, 9 Drawing Sheets

(56) References Cited

OTHER PUBLICATIONS

H. Kato, et al. "Virtual Object Manipulation on a Table-Top AR Environment" Augmented Reality, 2000, Oct. 5, 2000, pp. 111-119.
Naokazu Yokoya, et al. "Stereo Vision Based Video See-through Mixed Reality" Mixed Reality, Merging Real and Virtual Worlds. Proceedings of International Symposium on Mix Reality. Merging Real and Virtualworlds, Jan. 1, 1999, pp. 131-145.
C. Geiger, et al. "Development of an Augmented Reality Game by Extending a 3D Authoring System" Proceedings of the 2007 ACM SIGCHI International Conference on Advances in Computer Entertainment Technology, Jun. 13, 2007.
Hirokazu Kato, et al. "Marker Tracking and HMD Calibration for a Video-based Augmented Reality Conferencing System" Augmented Reality, 1999, Oct. 20, 1999, pp. 85-94.
Georg Klein, et al. "Parallel Tracking and Mapping for Small AR Workspaces" Proceedings of the Sixth IEEE and ICM International Symposium on Mixed and Augmented Reality (ISMAR2007), pp. 225-234, Nov. 13-16, 2007.
Ronen Gvili, et al. "Depth Keying" Stereoscopic Displays and Virtual Reality System, vol. 5006, No. 1, pp. 564-574, 2003.
G.J. Iddan, et al. "3D Imaging in the Studio (and Elsewhere . . . )" Three-Dimensional Image Capture and Applications, vol. 4298, No. 1, pp. 48-55, 2001.
G. Yahav, et al. "3D Imaging Camera for Gaming Application" Consumer Electronics, 2007, ICCE 2007, Digest Technical Papers, pp. 1-2.
Marc Op de Beeck, et al. "Towards an Optimized 3D Broadcast Chain" Proceedings of SPIE, vol. 4864, pp. 42-50, 2002.
European Office Action for Application 08252736.7 dated May 24, 2013.
Kato H et al: "Marker tracking and HMO calibration for a video-based augmented reality conferencing system"; Oct. 20, 1999; XP010358756.
Kato H et al: "Virtual object manipulation on a table-top AR environment"; Oct. 5, 2000; XP010520320.
Yokoya N et al: "Stereo Vision Based Video See-Through Mixed Reality"; Jan. 1, 1999; XP001118696.

* cited by examiner

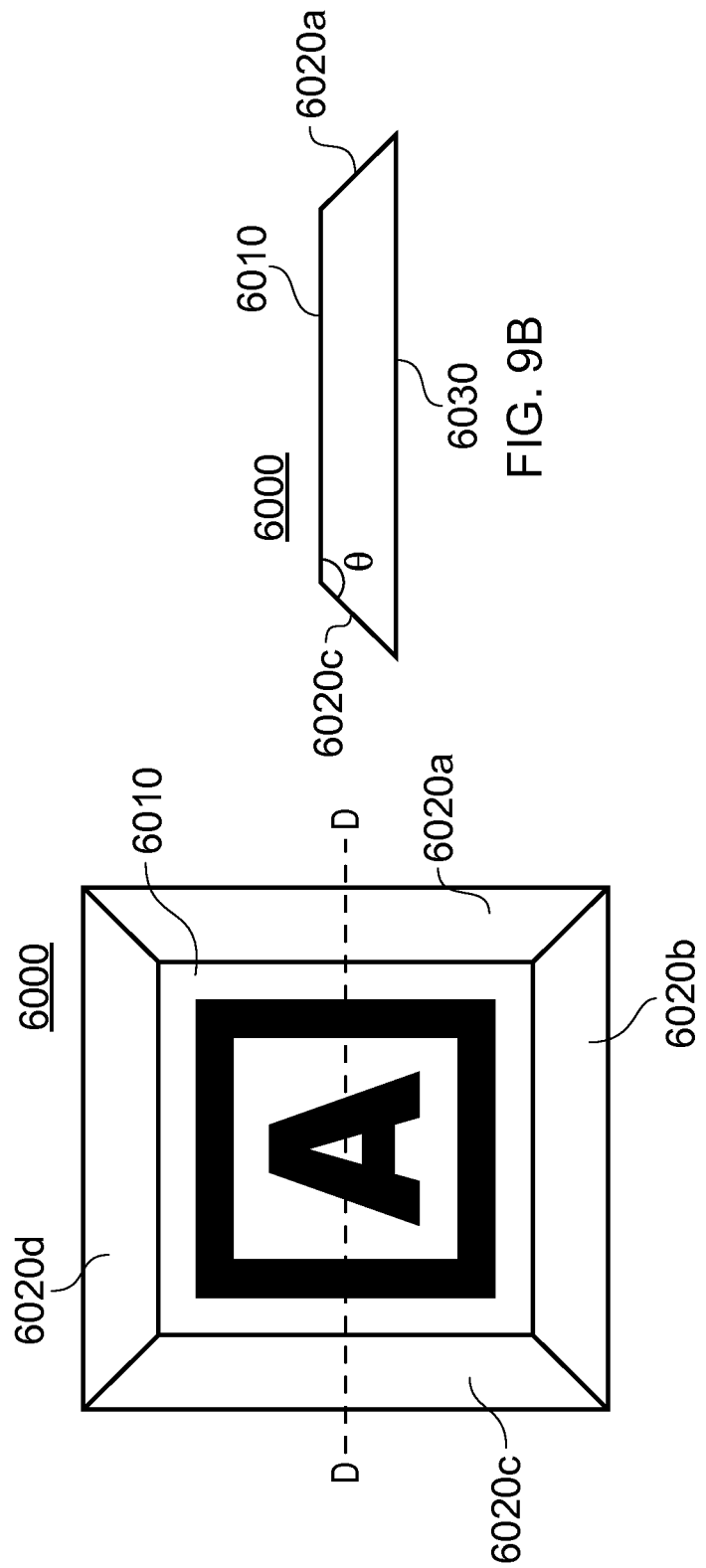

ENTERTAINMENT DEVICE, SYSTEM, AND METHOD

BACKGROUND OF THE INVENTION

1. Field of the Invention

The present invention relates to an entertainment device, system and method.

2. Description of the Prior Art

Recently, with the advent of ever more powerful computers, real time tracking of objects using a video camera has become more achievable. Furthermore, such systems may be used to combine real images with virtual images so as to generate augmented reality images and produce a content-rich media experience for a user. There are many different ways in which augmented reality images may be generated.

In some augmented reality systems, a previously known virtual map (for example generated using computer aided design to correspond to a real environment) may be matched to images of a real environment captured by a video camera. The map is then used to generate virtual reality images which may be superimposed on a captured video images or combined with the video images so as to generate the augmented reality images. However, such systems require that the map be registered or matched to the real world. Therefore, the matching of the virtual map to the real images may not be easy to carry out, especially if the map is not that detailed or if there are few objects which may be readily identified within a captured image.

Other systems, such as the one described in "Parallel Tracking and Mapping for Small AR Workspaces" G. Klein and D. Murray, Proceedings of the Sixth IEEE and ICM International Symposium on Mixed and Augmented Reality (ISMAR2007) pages 225-234, 13-16, Nov. 2007, track feature points within a series of video images and generate a map accordingly. In some systems, the map may be generated by extensible tracking of objects within the sequence of captured video images. Once a rudimentary map has been generated, the map can then be used to insert virtual objects into a scene. However, such map generation can be computationally expensive. Furthermore, to create a map which relates to static feature points, the camera needs to panned or tilted so that the captured scene differs from frame to frame, thus enabling feature points to be tracked. Therefore, such systems may struggle to generate an adequate map where a camera is static or where there are few feature points to be tracked (for example as might occur with a planar surface such as a table top).

Augmented reality is increasingly being used in video game systems. For example, a video game called "The Eye of Judgment" published by Sony Computer Entertainment® uses a system where game cards may be detected by a video camera and augmented reality images generated such that game creatures may be displayed superimposed on the detected game cards. However, once a game card has been played, such systems may offer little further real time interaction with the game system.

The present invention seeks to alleviate or mitigate the above problems.

SUMMARY OF THE INVENTION

It is an object of the present invention to provide and improved augmented reality experience for a user.

In a first aspect, there is provided an entertainment device for combining virtual images with real images captured by a video camera so as to generate augmented reality images, the device comprising: receiving means operable to receive a sequence of video images from the video camera via a communications link; detecting means operable to detect an augmented reality marker within the received video images; and processing means operable to generate a virtual image plane in dependence upon the detection of the augmented reality marker by the detecting means, the virtual image plane being arranged to be substantially coplanar with a real surface upon which the augmented reality marker is placed so that virtual images may be generated with respect to the real surface, in which: the processing means is operable to generate the virtual image plane within the captured video images such that the virtual image plane is defined with respect to the detected augmented reality marker; and the virtual image plane has an area which is greater than an area which corresponds to the augmented reality marker.

In a second aspect, there is provided a method of combining virtual images with real images captured by a video camera so as to generate augmented reality images, the method comprising: receiving means a sequence of video images from the video camera via a communications link; detecting an augmented reality marker within the received video images; and generating a virtual image plane in dependence upon the detection of the augmented reality marker by the detecting means, the virtual image plane being arranged to be substantially coplanar with a real surface upon which the augmented reality marker is placed so that virtual images may be generated with respect to the real surface, in which: the virtual image plane is generated within the captured video images such that the virtual image plane is defined with respect to the detected augmented reality marker; and the virtual image plane has an area which is greater than an area which corresponds to the augmented reality marker.

In a third aspect, there is provided an augmented reality marker for use with an augmented reality generation system, the augmented reality marker comprising: a primary facet comprising an image for recognition by the augmented reality generation system; and one or more secondary facets arranged with respect to the primary facet such that the primary facet is not parallel to the one or more secondary facets.

By generating a virtual image plane such that it is defined with respect to a detected augmented reality marker, embodiments of the present invention advantageously provide a way in which a real environment may be mapped so that augmented reality images can be generated. For example, by detecting a distortion of the augmented reality marker, calibration of a surface upon which the augmented reality marker is placed may be carried out using a static video camera. Additionally, processing resources needed to detect the marker and map a virtual image plane to a real surface can be reduced because the marker may provide an easily detected image feature without the need for multiple point tracking through a sequence of images.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 9A is a schematic diagram of an augmented reality marker in accordance with an embodiment of the present invention, and FIG. 9B is a cross-sectional view of the augmented reality marker shown in FIG. 9A.

DESCRIPTION OF THE PREFERRED EMBODIMENTS

An entertainment device, system and method are disclosed. In the following description, a number of specific details are presented in order to provide a thorough understanding of embodiments of the present invention. However, it will be apparent to a person skilled in the art that these specific details need not be employed to practise the present invention. Conversely, specific details known to the person skilled in the art are omitted for the purposes of clarity in presenting the embodiments.

Figure 1:
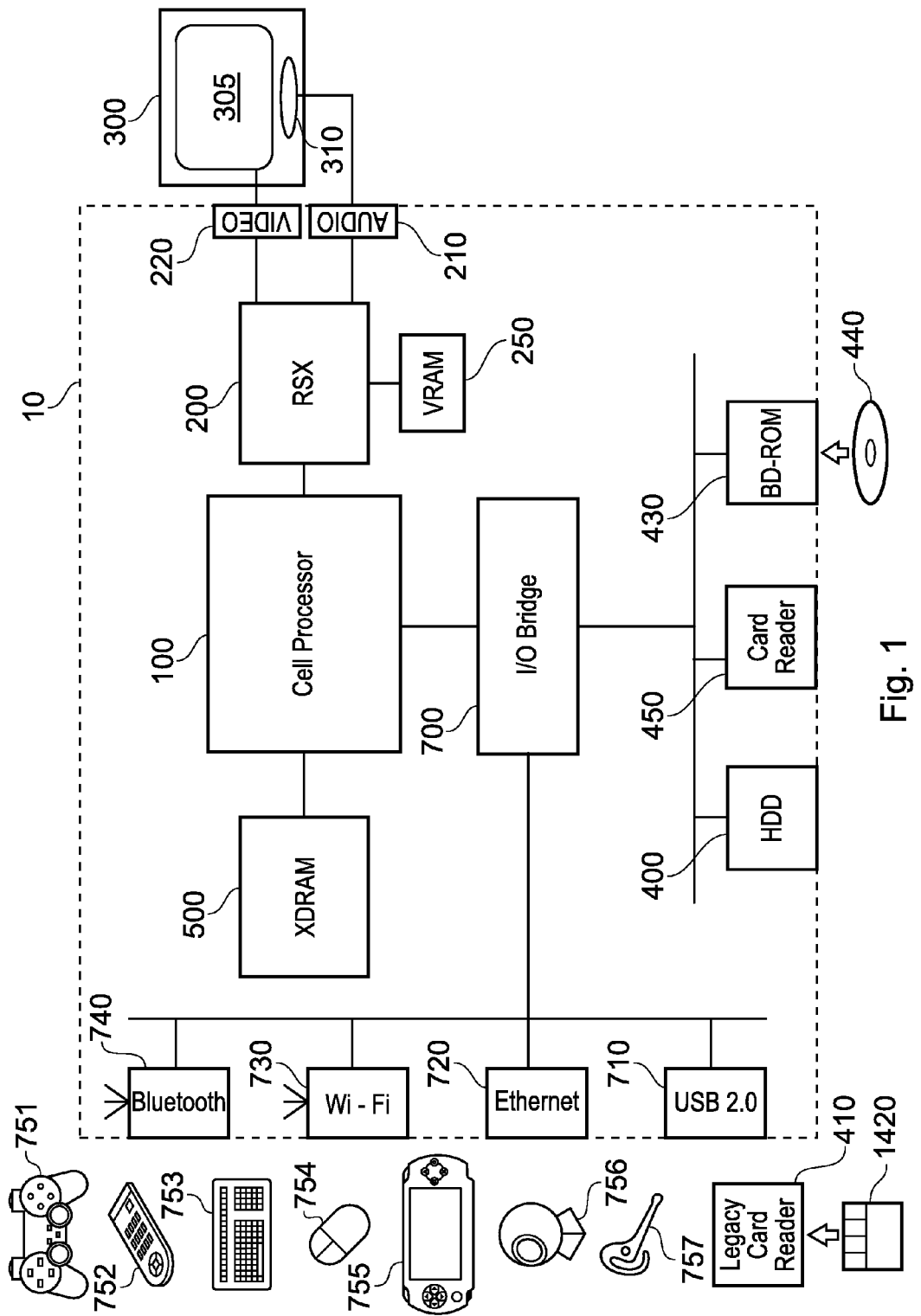
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
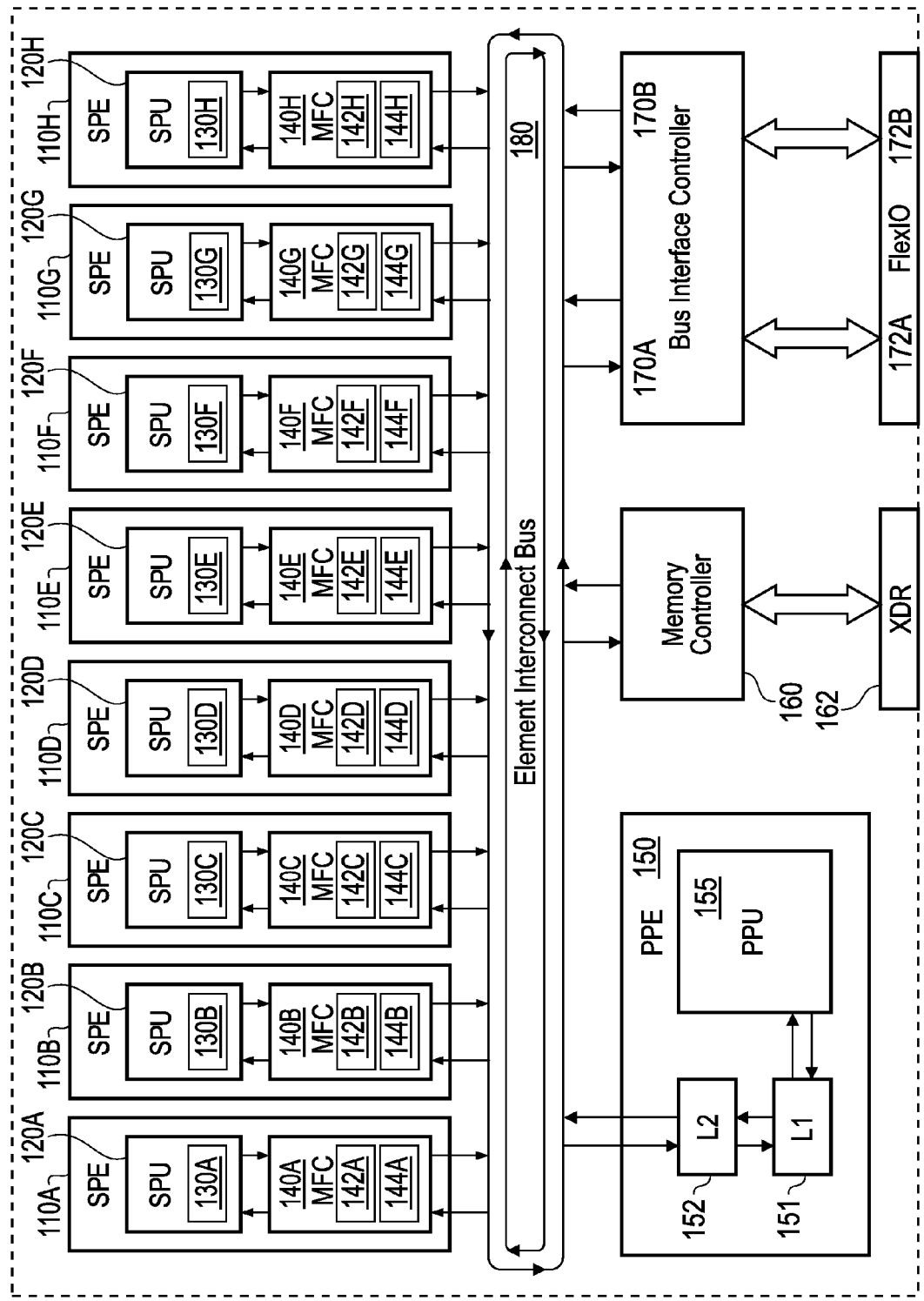
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation.

The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
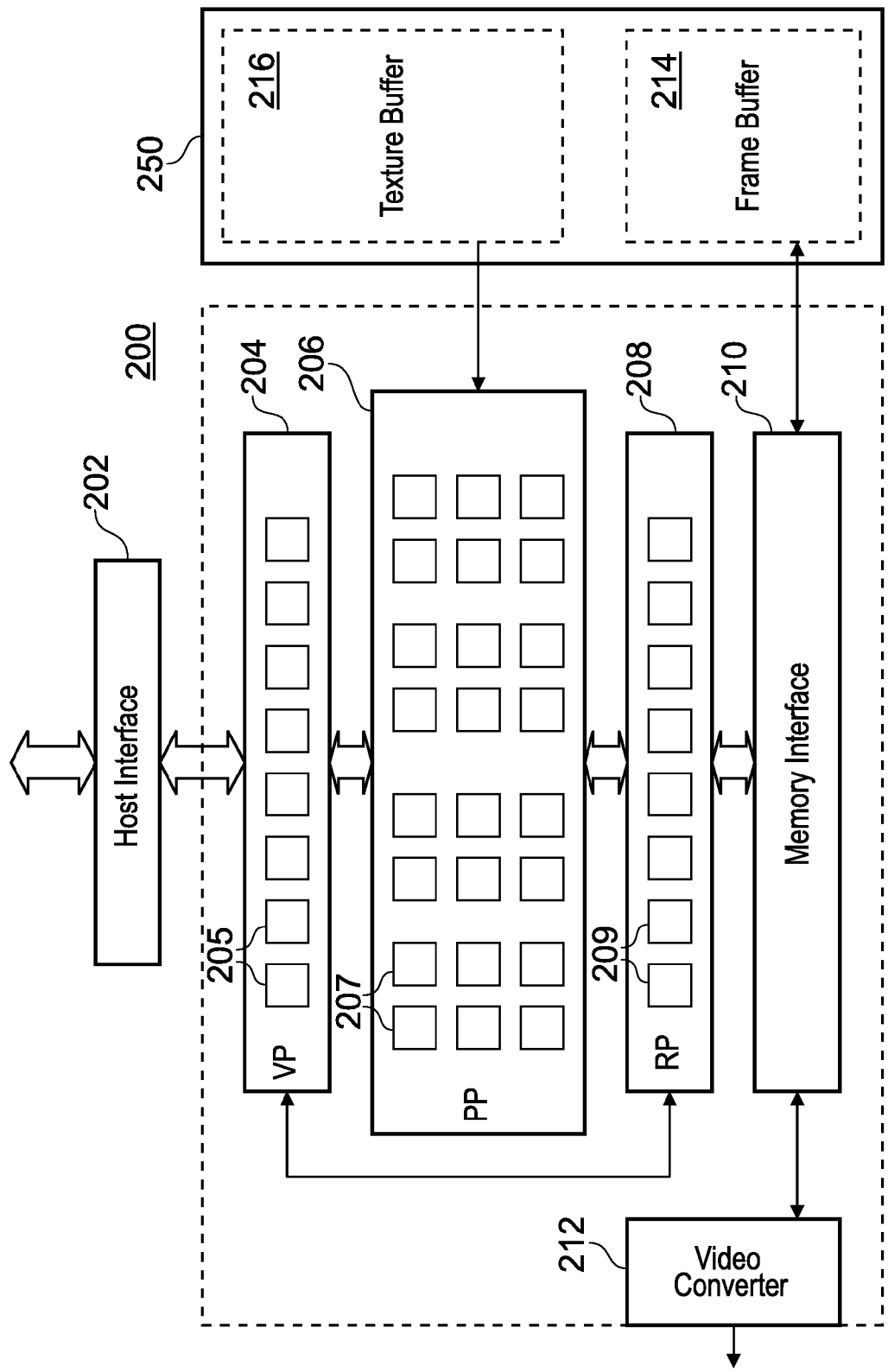
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself It will be appreciated that the term "on-line" does not imply the physical presence of wires, as the term can also apply to wireless connections of various types.

Embodiments of the present invention in which an augmented reality marker is used to calibrate a real world space so that augmented reality images may be generated will now be described with reference to FIGS. 4 to 8.

Figure 4:
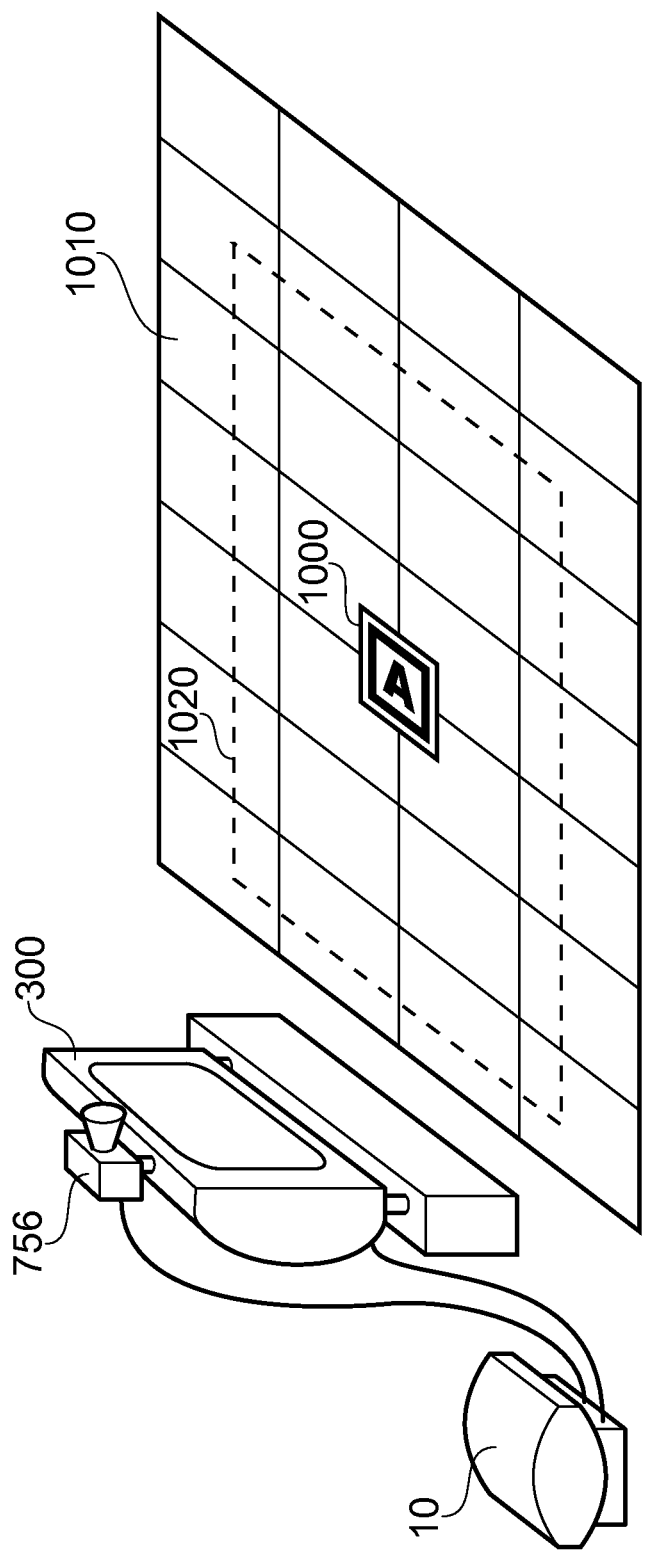
FIG. 4 is a schematic diagram of an arrangement of an entertainment system with respect to an augmented reality marker in accordance with an embodiment of the present invention.

FIG. 4 shows a schematic diagram of an entertainment system arranged to detect an augmented reality marker so that a user may interact with a video game. In the embodiments described below, the entertainment system is the same as that described above with reference to FIGS. 1 to 3. However, it will be appreciated that any suitable entertainment system could be used.

In particular, FIG. 4 shows the entertainment device 10, which is operably connected to the video camera 756 and the display and sound output device 300. Other elements of the entertainment system such as the game controller 751 have been omitted from FIG. 4 for the sake of clarity in understanding the drawing. In embodiments of the present invention, the video camera 756 is arranged to capture images of an augmented reality marker 1000. The detection of the augmented reality marker 1000 may then be used to generate a virtual image plane 1010 which relates to a real surface upon which the augmented reality marker 1000 is placed. The cell processor 100 can then generate an interaction area 1020 (indicated by the dashed line in FIG. 4). The interaction area is an area of the captured images within which virtual images may be generated and combined with the captured video images so that a user may interact with the virtual images. The interaction area will be described in more detail later below.

In embodiments of the present invention, the interaction area 1020 allows a user to interact with, for example, a virtual pet, which may be displayed combined with images of the real environment. For example, the virtual pet may displayed such that it appears to walk or run around on the virtual image plane 1010 within the interaction area 1020. This provides a user with images which make it appear as if the virtual pet is actually on the surface upon which the augmented reality marker 100 was placed.

The way in which this functionality is achieved is described below.

In order for a virtual reality object, such as a virtual pet, to be combined with real images in such a way as to be believable to a user, the position of the video camera 756 and the images captured by the video camera 756 must be calibrated in such a way as to allow virtual images to be rendered so that they correspond to a real surface in, for example, a user's living room. Once this has been done, the virtual pet may be rendered in such a way as to make it appear to move around on that surface. For example, the camera can be calibrated so that the virtual image plane 1010 corresponds to a tabletop in the user's living room. The virtual pet can then be rendered such that it appears to run around on the tabletop, giving the illusion to the user that the pet is in the user's room.

Accordingly, embodiments of the invention allow the virtual image plane 1010 to be calibrated from the position of the augmented reality marker 1000 on a real surface (such as the tabletop). To achieve this, the user places the augmented reality marker 1000 on a suitable surface so that the augmented reality marker 1000 is within a field of view of the video camera 756. The cell processor 100 then generates the virtual image plane 1010 accordingly.

In some embodiments, this calibration process may be carried out at the start of a game, for example by a user placing the augmented reality marker 1000 on a surface to be calibrated in response to an on-screen prompt generated by the cell processor 100. In other embodiments, the calibration may be carried out in response to a user selection via a suitable user interface (for example a game controller 751) indicating that calibration of the virtual image plane 1010 should be carried out. However, it will be appreciated that the calibration could be carried out at any suitable point in the game.

The way in which the virtual image plane is generated will now be described.

Figure 5:
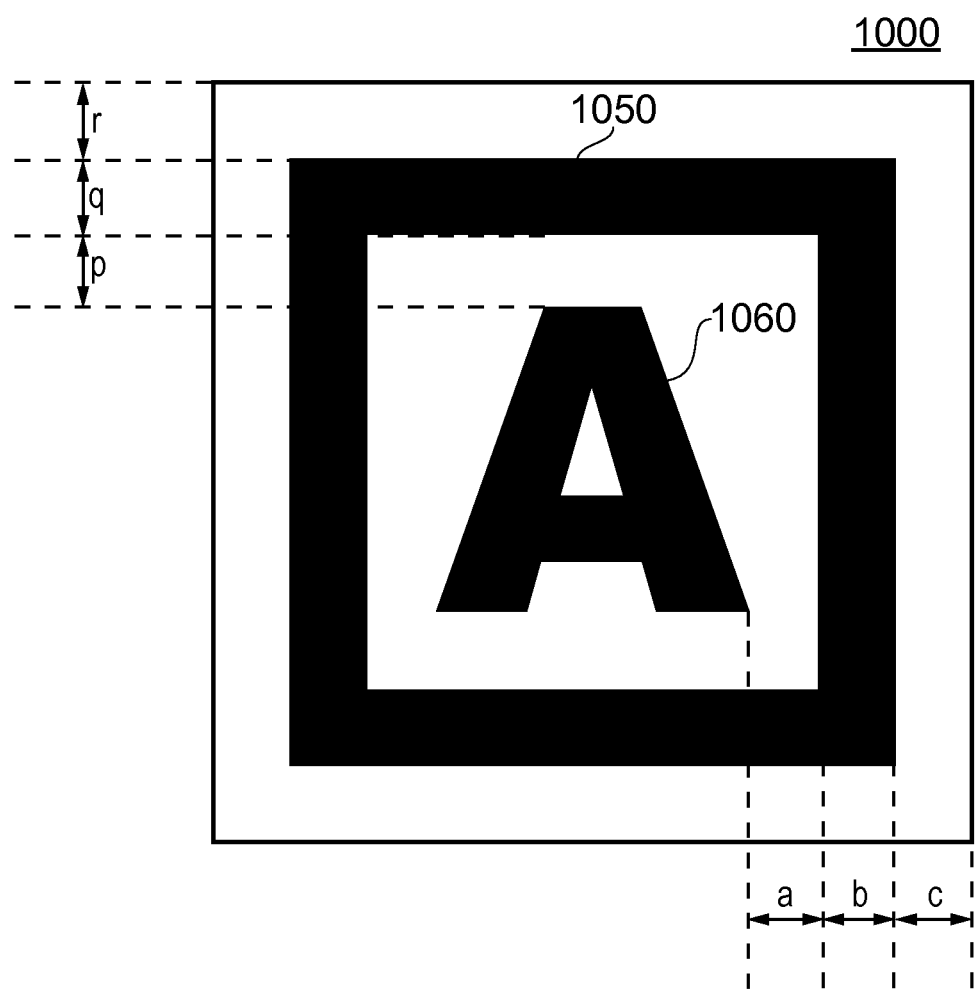
FIG. 5 is a schematic diagram of an example of an augmented reality marker in accordance with an embodiment of the present invention.

FIG. 5 shows an example of an augmented reality marker 1000 which may be used to calibrate the virtual image plane 1010 in accordance with embodiments of the present invention.

The augmented reality marker 1000 comprises an image of a square 1050 together with an alphanumeric character such as the letter "A" 1060, although it will be appreciated that other suitable symbols or patterns could be used. The augmented reality marker 1000 shown in FIG. 5 is two-dimensional although it will be appreciated that such markers may be applied to a three dimensional object as shown for example in FIG. 7.

During calibration, the cell processor 100 detects the augmented reality marker 1000 by analysing the images captured by the video camera 756. The cell processor 100 applies an image threshold to the captured images so as to generate a binary black and white image. The cell processor 100 then detects pixel regions which are likely to correspond to the square 1050 (also referred to as a "quad"), using known techniques such as edge following and template matching. Those regions of an analysed image which are detected by the cell processor 100 as comprising quads are then analysed using known techniques to detect whether there is an alphanumeric character e.g. the letter A 1060 within the square 1050.

The cell processor 100 then calculates a probability associated with each image region that is detected as comprising an alpha numeric character within a quad. The cell processor then detects which image region has the highest probability and labels that region as corresponding to the augmented reality marker 1000. The position of the augmented reality marker 1000 may then be used as a reference point about which the virtual image plane 1010 and the interaction area 1020 may be defined.

In the example augmented reality marker shown in FIG. 5, a distance (denoted "a" in FIG. 5) between the alphanumeric character A 1060 and the inside of the quad 1050 is substantially the same as that of a thickness (denoted "b" in FIG. 5) of the quad 1050 and a distance (denoted "c" in FIG. 5) between the outside of the quad 105 and an outside edge of the marker 1000. Additionally, a distance (denoted "p" in FIG. 5) between the alphanumeric character A 1060 and the inside of the quad 1050 is substantially the same as that of a thickness (denoted "q" in FIG. 5) of the quad 1050 and a distance (denoted "r" in FIG. 5) between the outside of the quad 105 and an outside edge of the marker 1000. In other words, in an embodiment, a=b=c=p=q=r. This assists the cell processor 100 in detecting the marker because the marker 1000 can be split up into a grid of 5 by 5 sub regions which may be individually analysed by the cell processor 100 so as to help detect a quad together with an alphanumeric character, other symbol or pattern.

However, in most arrangements, such as the one shown in FIG. 4, the optical axis of the video camera 756 will not be perpendicular to a surface upon which the augmented reality marker 1000 is placed. Accordingly, the captured image of the augmented reality marker 1000 is likely to be distorted. To address this, when detection of quads is carried out by the cell processor 100, the cell processor 100 is also operable to detect rotational, skew and trapezoidal transforms of the augmented reality marker 1000 using known techniques.

Once the augmented reality marker 1000 has been detected, the distortion of the image of the augmented reality marker 1000 may then be advantageously analysed to detect the surface (for example, a tabletop) upon which the augmented reality marker 1000 is placed. Assuming that the surface upon which the augmented reality marker 1000 is placed is a substantially planar surface and that the marker is arranged to be substantially co-planar with the surface, then the virtual image plane 1010 may be generated accordingly by mapping the detected distortion of the marker 1000 to the surface.

In an embodiment, a representation of the augmented reality marker 1000, including for example the shape and size of the marker 1000, is preloaded into the XDRAM 500 from a suitable recording medium such as a Blu-ray® disc 440 or from the HDD 400. In an embodiment, the cell processor 100 is operable to calculate a transform which corresponds to transforming the marker 1000 so that it is a predetermined distance away from the video camera 756 and perpendicular to the optical axis of the camera. As the marker 1000 is parallel (arranged to be substantially co-planar) to the surface upon which it is placed (at least in those circumstances where the surface is substantially planar), the resultant calculated transform may be used to calculate coordinates which define the virtual image plane 1010. However, it will be appreciated that other suitable methods for generating the virtual image plane 1010 from the detection of the marker could be used.

In another embodiment, if the dimensions of the augmented reality marker 1000 are not previously known, a calibration of the shape and size of the marker 1000 may be carried out by the system unit 10 in response to a user selection from a suitable menu displayed on the display and sound output device 300.

During this calibration, the user holds the augmented reality marker 1000 within the field of view of the video camera 756 so that the augmented reality marker 1000 is normal to the optical access of the video camera 756 and is a predetermined distance away from the video camera 756. The cell processor 100 then detects the dimensions of the augmented reality marker 1000 from the size of the captured image with respect to a full-pixel resolution of the camera using known techniques and stores the resultant image to memory so that the marker can be detected. Accordingly, the dimensions and the stored image form a predetermined representation of the marker which may be used to detect the augmented reality marker within the captured images and detect a degree of distortion between the detected marker and the predetermined representation so as to generate the virtual image plane 1010.

As well as, or instead of, detecting the dimensions of the marker and storing an image of the marker, an augmented reality marker mask may be generated by applying a binary threshold to the captured image an edge detection. The resultant mask may then form the representation of the marker which is used to detect the marker and calculate the degree of distortion between the marker and the predetermined representation. However, it will be appreciated that any other suitable method of generating the predetermined representation of the augmented reality marker may be used.

In an embodiment, only one image frame is used to calibrate the virtual image plane as described above. This may be performed in response to a selection by the user that calibration of the image plane 1010 is to be carried out. Alternatively, the calibration of the virtual image plane 1020 to the actual surface upon which the marker 1000 is placed may be performed automatically on loading a game. In other embodiments, the virtual image plane 1020 is calibrated by calculating the mean average of coordinates relating to virtual image planes each generated from respective images within a sequence of video images. In some embodiments, a user may place the augmented reality marker within an area of the field of view of the camera 756 as indicated by the system 10 on the display 305 so that calibration of the virtual image plane may be carried out as described above. However, it will be appreciated that the virtual image plane may be calibrated at any other suitable point in the game, in response to an indication by the system 10 that calibration is to be carried out or in response to any other suitable user input.

Once calibration of the virtual image plane has been carried out, a user can then remove the virtual reality marker 1000 from the field of view of the video camera 756. By using an augmented reality marker to calibrate a virtual image plane, calibration of the plane may be carried out quickly and efficiently so that the virtual image plane can be used during generation of augmented reality images.

In embodiments of the present invention, a virtual pet may be generated by the system unit 10 so that the pet can be displayed on the display and sound output device 300 and appear combined with the real images.

In one embodiment, the virtual image plane 1010 may be generated by the cell processor 100 so that the virtual image plane 1010 extends throughout the field of view of the video camera 756. However, if the pet is caused to move around in the virtual image plane 1010, either in response to user input or in response to instructions generated by the cell processor 100, other real objects within the images captured by the video camera 756 may overlap with a generated position of the virtual pet, thereby detrimentally affecting the illusion of a virtual pet in a real environment.

For example, this may occur where the planar surface upon which the augmented reality marker 1000 has been placed is a floor of a user's living room. In this situation, there may be furniture around the edge of the room which is also within the field of view of the video camera 756 which might affect the generation of the augmented reality images. To address this problem, the cell processor 100 is operable to generate an interaction area which is a region of the captured images in which the virtual reality object may be displayed for interaction with the user. The interaction area 1020 is shown as the dashed line in FIG. 4. In embodiments of the present invention, movements of the virtual pet are restricted so that the pet can only move within the virtual interaction area 1020. Accordingly, movement of the virtual pet is less likely to cause the virtual pet to be displayed in an area of the screen 305 which corresponds to other real world objects.

The user may interact with the virtual pet via any suitable user interface such as the game controller 751. Preferably, the user interacts with the virtual pet via motion, images of which are captured by the video camera 756. The cell processor 100 analyses the captured images for motion occurring near the pet using known techniques, and modifies and controls the behaviour of the virtual pet accordingly. A user can also interact with other virtual objects generated by the cell processor 100 in a similar way.

In embodiments of the present invention, the interaction area 1020 is automatically set by the cell processor 100 to be centred on the detected augmented reality marker 1000 and to be 50 percent of the full pixel area of the images captured by the video camera 756. In other embodiments, the interaction area 1020 is set by the cell processor 100 to correspond to 50 percent of the full pixel area of the images captured by the video camera 756 and to be a lower half of the full pixel area. However, it will be appreciated that any other suitable percentage of the pixel area or location of the selected area with respect to the marker 1000 may be used.

Additionally, a user may select the shape of the interaction area 1020 by using a suitable user interface and an on screen selection menu generated by the cell processor 100. For example, as shown in FIG. 4, the interaction area 1020 could be rectangular with the centre of the rectangle corresponding to the position of the augmented reality marker 1000 which was used to calibrate the virtual image plane. In some embodiments, the shape of the interaction area 1020 is substantially trapezoidal in the virtual image plane 1010 so that when the virtual image plane 1010 is mapped to a plane parallel to an image plane of the camera 756, the interaction area 1020 appears to be rectangular. However, it will be appreciated that other shapes of interaction area may be used and that the interaction area need not be centred on the virtual reality marker 1000.

Alternatively, the interaction area is generated by the cell processor 100 so that the interaction area corresponds to detected interaction area pixels. Interaction area pixels are those which surround the detected augmented reality marker 1000 and are colour matched to within a predetermined colour threshold with respect to a detected colour of one or more pixels adjacent to pixels which correspond to the augmented reality marker 1000. The cell processor 100 detects the interaction area pixels by detecting an average colour of pixels which are adjacent to those corresponding to the augmented reality marker 1000. The cell processor 100 then detects which pixels are contiguous with the pixels adjacent to the augmented reality marker 1000 and are within a predetermined colour threshold of the pixels adjacent to the augmented reality marker 1000 so as to generate the interaction area pixels.

However, a problem may occur if there are some pixels surrounding the augmented reality marker 100 which are a different colour or luminance to a majority of the pixels surrounding the marker 1000 but which should nevertheless be included in the interaction area. For example, this may occur if there is a dark spot on a carpet on which the marker 1000 is placed. In this case, the dark spot would be excluded from the interaction area, thus preventing the virtual pet from entering that area. Therefore, in an embodiment, the cell processor is operable to apply known pixel smoothing and/or filtering techniques as appropriate to pixels surrounding the augmented reality marker 1000 before carrying out the detection of the interaction area pixels. This reduces the likelihood that any small image features surrounding the marker 1000 and occurring on a surface upon which the augmented reality marker 1000 is placed are incorrectly excluded from the interaction area.

In one embodiment, the cell processor is operable to limit the generation of interaction area pixels so that they only occur within, for example, 50 percent of the full pixel area of the images captured by the video camera 756 centred on the marker 1000 as described above. However, it will be appreciated that any other suitable percentage of the pixel area or location of the selected area with respect to the marker 1000 may be used.

An embodiment in which two augmented reality markers are used to define the interaction area 1020 will now be described with reference to FIG. 6.

Figure 6:
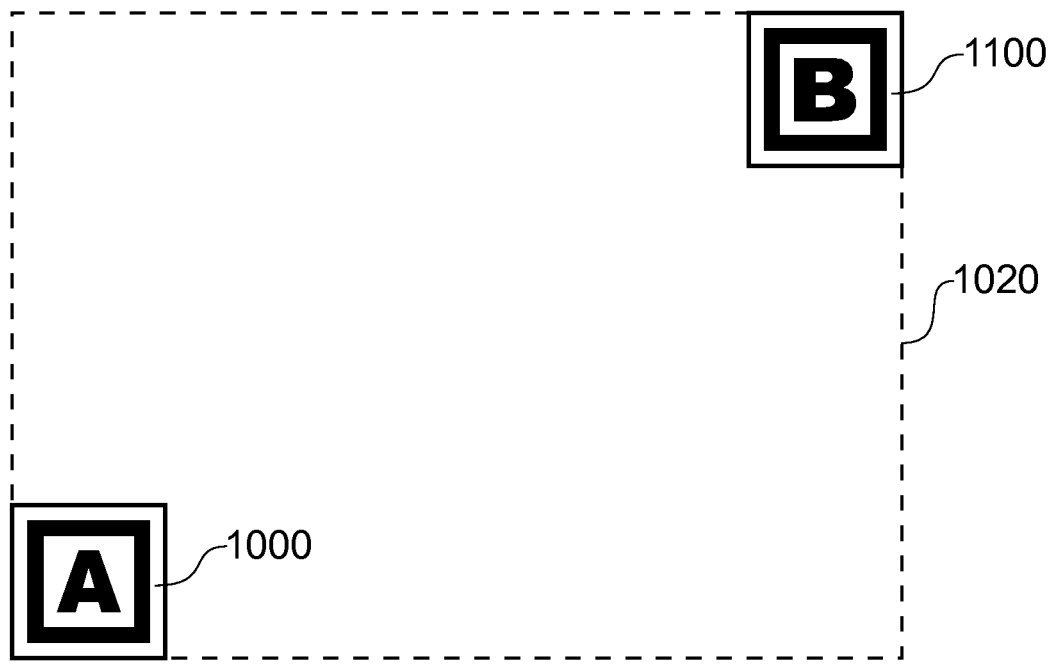
FIG. 6 is a schematic diagram of a three-dimensional augmented reality marker in accordance with an embodiment of the present invention.

FIG. 6 shows augmented reality marker 1000 together with another augmented reality marker 1100. In this embodiment, the cell processor 100 is operable to detect the augmented reality marker A 1000 and the augmented reality marker B 1100 and generate the interaction area so that at least part of a perimeter of the interaction area 1020 corresponds with the detected augmented reality markers 1000 and 1100. For example, the augmented reality markers 1000 and 1100 may indicate the corners of a rectangle as shown in FIG. 6. In this way, a user may position the augmented reality markers 1000 and 1100 so that they delineate the corners of the interaction area within a physical space such as the floor of a living room. Additionally, the cell processor 100 can detect the relative size and any image distortion of the two markers using known techniques so as to map the virtual image plane 1010 (not shown in FIG. 6) to the surface upon which the markers are placed.

It will be appreciated that the augmented reality markers 1000 and 1100 may be used to indicate the perimeter an interaction area having a shape which is different from that of the interaction area 1020 shown in FIG. 6. Accordingly, it will be appreciated that the shape of the interaction area 1020 need not be limited to a rectangle and that other shapes such as a square, a circle and a triangle and the like may be used.

Additionally, any number of augmented reality markers may be used to indicate the perimeter of the interaction area 1020. However, an increase in the number of augmented reality markers may increase the amount of processing resources needed to detect the markers and therefore generate the interaction area. Additionally, an interaction area defined in this way may sometimes cause "invisible walls" to be generated such that the virtual pet can not go outside the interaction area (i.e. they are stopped by an invisible wall). This can sometimes adversely affect the illusion of the virtual pet in the real environment because a user cannot see the edge of the interaction area. However, such a system for defining the interaction area may be useful if there are many real objects in the real environment which should not be part of the interaction area.

An embodiment in which a three dimensional augmented reality marker may be used will now be described with reference to FIG. 7.

Figure 7:
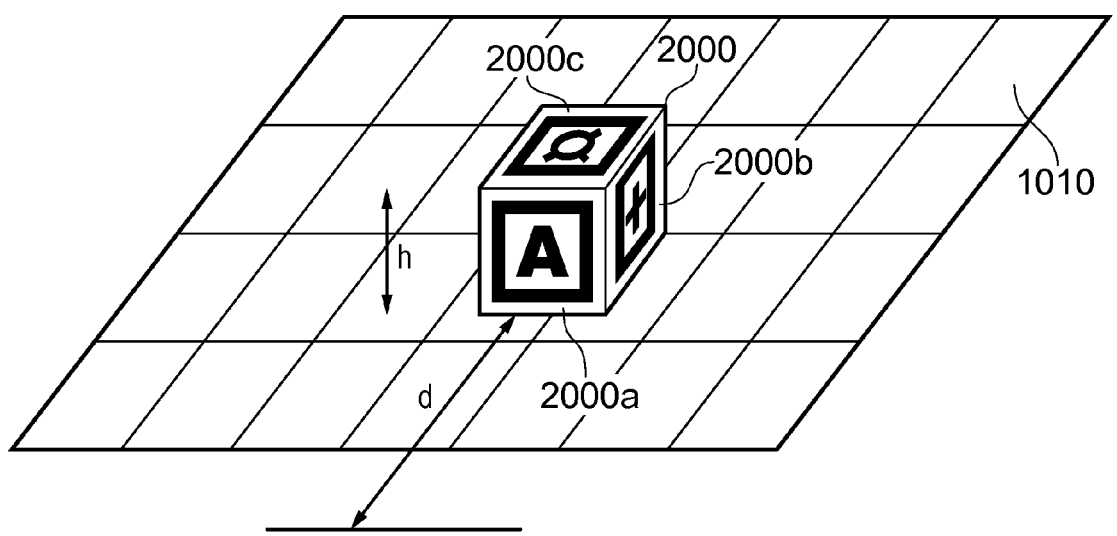
FIG. 7 is a schematic diagram of an interaction area and two augmented reality markers in accordance with an embodiment of the present invention.

FIG. 7 shows a three dimensional augmented reality marker 2000 which may be used to generate the virtual image plane 1010 and/or the interaction area 1020. In the embodiment shown in FIG. 7, the three dimensional virtual reality marker 2000 is a cube comprising a plurality of marker faces 2000*a*, 2000*b* and 2000*c*, each of which comprises a quad in which there is a shape indicating the relative orientation of that marker face. For example, the marker face 2000*a* comprises a quad in which an alphanumeric character "A" is shown. The marker faces 2000*b* and 2000*c* show two different non-alphanumeric characters. However, it will be appreciated that other three dimensional shapes may be used for the virtual augmented reality marker 2000 and that the images on the marker need not be planar in nature.

The use of a three-dimensional augmented reality marker addresses a problem which may occur if the optical axis of the camera forms an acute angle with a line parallel to the surface upon which the augmented reality marker is placed. In this case, distortions of a two dimensional marker placed on the surface may be so great as to mean that detection by the cell processor 100 of the augmented reality marker 1000 becomes unlikely or impossible. Even if detection of the marker is possible, it may not be possible to detect the distortion with sufficient accuracy to use the marker to calibrate the virtual image plane.

However, by using a three dimensional augmented reality marker such as the augmented reality marker 2000, at least part of the marker is likely to be substantially perpendicular to the optical axis of the video camera 756. This advantageously increases the likelihood that the marker will be detected. In the example shown in FIG. 7, the cell processor 100 is likely to detect the marker face 2000*a* and assign that region of the image as corresponding to the marker 2000. Given a height h of the augmented reality marker 2000 (which may be predetermined within software, loaded from a suitable storage medium, input by a user and the like), the cell processor 100 can then detect the distortion of marker faces 2000*b* and 2000*c* so as to generate the virtual image plane 1010. The virtual image plane and the interaction area 1020 are generated as described above with reference to FIGS. 4 to 6.

In some embodiments, the video camera 756 is operable to generate depth information which relates to a distance between the video camera 756 and objects within the field of view of the video camera 756. Such cameras are generally termed "Z-Cameras" because they measure the "z" coordinate and are known in the art (see, for example, http://www.3dvsystems.com/technology/tech.html, which relates to the Z-Cam manufactured by 3DVsystems). Various different techniques such as time-of-flight and infra-red pattern distortion are known for generating depth information, so these techniques will not be described in detail here.

In one embodiment, the depth information for each pixel is generated by the video camera. Alternatively, the depth information for each pixel may be generated by the cell processor 100 by analysing the data received from the camera. In this way, a distance d (as shown in FIG. 7) to the augmented reality marker 2000 can be detected. The cell processor 100 then generates the virtual image plane 1010 within the captured video images such that the virtual image plane is defined with respect to the detected three dimensional spatial position of the augmented reality marker 2000 as described above.

The use of a camera which is operable to generate depth information may also be used to detect advantageously objects which are greater than a predetermined distance above the virtual image plane. In an embodiment, objects which are detected as being greater than a predetermined distance above the virtual image plane are excluded from the interaction area. This prevents objects which may overhang the interaction area or which obscure the interaction area such as a tabletop from being included in the interaction area.

Furthermore, the use of a z-camera can, for example, allow the cell processor 100 to generate the virtual pet such that the pet can appear to run around the back of an object (i.e. be temporarily obscured from the view of the camera). In other words, the Z-camera can be used to detect an occlusion of a virtual object (e.g. the virtual pet) by a real object in the real environment. To achieve this, the cell processor is operable to detect, by analysing the depth information, whether a virtual reality object position (e.g. the position of the virtual pet) is such that the virtual reality object is occluded from a point of view of the video camera by a real object. If the virtual reality object is detected to be occluded by the real object, the cell processor 100 can then generate the virtual object so that the virtual object appears to be behind the real object. This improves an illusion to a user that the virtual pet is actually in the real environment.

In embodiments of the invention, a user may interact with, for example, the virtual pet, by moving their hand near the virtual pet. To achieve this functionality, the cell processor 100 causes an image in which there are no moving objects (for example when calibrating the virtual image plane using the augmented reality marker 1000 or the augmented reality marker 2000) to be stored to the XDRAM 500 of the HDD 400 and assign this image as a background image. Subsequent image frames are then analysed by the cell processor 100 to detect changes in pixel values with respect to the background image. Any pixel values which change with respect to the background image are labelled as foreground pixels and are likely to correspond to motion by, for example, a user. The cell processor 100 then carries out known object detection and tracking techniques to assign an object type to respective foreground pixels. In an embodiment, each interaction object may interact with the virtual pet in a different way.

For example, a rapid change in pixel value above the pet, but in close proximity to the pet, may correspond to a user mimicking a tickling motion and therefore the cell processor 100 can render the pet so that it reacts accordingly. However, it will be appreciated that any other forms of interaction may be used and that other virtual reality objects such as footballs, vehicles, tools and the like could be simulated.

Additionally, the augmented reality marker 1000 or the augmented reality marker 2000 may be used as a game feature within a game executed by the entertainment device 10. For example, where the game allows interaction with a virtual pet, the augmented reality marker could be used to simulate a pet feeding device such as a water bottle or the marker may be used to indicate where simulation of cleaning the pet (for example, giving the pet a bath) should be carried out. As another example, the augmented reality marker could correspond to a food container which can be filled from a virtual food dispensing device with virtual food for the pet. The user may then manipulate the augmented reality marker so as to cause the virtual food in the container to be dispensed into a virtual food bowl generated by the cell processor 100. However, it will be appreciated that the augmented reality marker could act as any suitable object or indicator appropriate to a game with which it is associated.

In some embodiments, the cell processor 100 is operable to cause the reality simulator graphics unit RSX 200 to render a virtual hole in the virtual image plane 1010. In other words, it will appear to a user as if there is a hole in, for example, the floor of their room. The cell processor 100 can then cause virtual objects and/or the virtual pet to appear and disappear (also referred to respectively as spawning an object and removing an object from the augmented reality environment) through the virtual hole as, and when, a virtual object and/or a virtual pet are generated or removed from the virtual environment. The cell processor 100 can then cause the virtual hole to disappear once an object or the pet has been generated (spawned) or removed from the augmented reality environment. A method of generating a virtual image plane will now be described with reference to FIG. 8.

Figure 8:
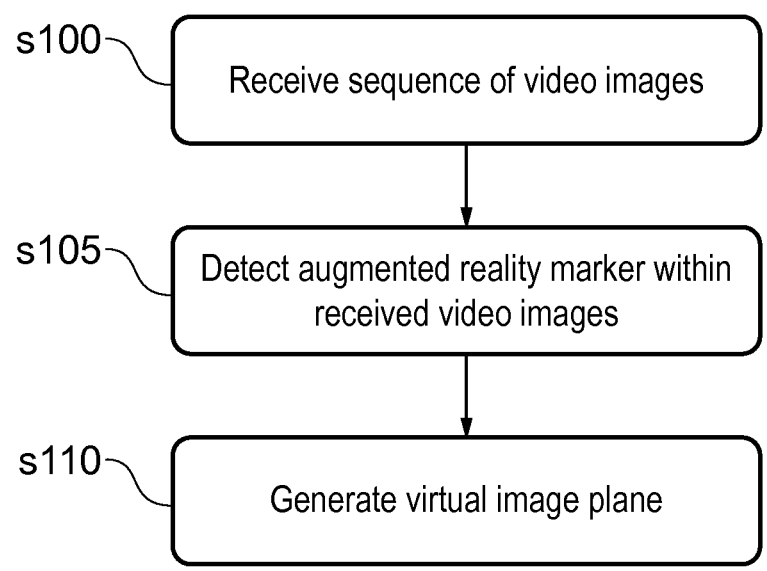
FIG. 8 is a flow chart showing a method of generating a virtual image plane in accordance with an embodiment of the present invention.

FIG. 8 is a flow chart showing a method of generating a virtual image plane in accordance with embodiments of the present invention. As a first step s100, a sequence of video images captured by the video camera 756 is received by the entertainment device 10 via a communications link such as WIFI or Bluetooth®. Then, at a step s105, the cell processor 100 detects the augmented reality marker within the received video images as described above. Once an augmented reality marker has been detected at the step s105, the cell processor 100 is operable to generate, at a step s110, the virtual image plane such that the virtual image plane is defined within the captured video images, and the virtual video image plane is defined with respect to the detected augmented reality marker as described above. In other words, the cell processor 100 may generate the virtual image plane so that the virtual image plane corresponds with a surface (i.e. arranged to be substantially co-planar with the surface) upon which the augmented reality marker is placed.

An augmented reality marker which may be used as an augmented reality marker as described above will now be described with reference to FIGS. 9A and 9B.

FIG. 9A shows an augmented reality marker in accordance with an embodiment of the present invention. In particular, FIG. 9A shows an augmented reality marker 6000 having a primary facet 6010. In an embodiment, the primary facet comprises an image for recognition by the system unit 10 together with the video camera 756 as described above. For example, the primary facet 6010 can comprise a quad together with an alphanumeric character as described above with reference to FIG. 5. However, it will be appreciated that the primary facet 6010 could comprise any other suitable symbol or pattern.

The augmented reality marker 6000 shown in FIGS. 9A and 9B also comprises a plurality of secondary facets 6020*a*, 6020*b*, 6020*c*, and 6020*d*. The secondary facets 6020*a*, 6020*b*, 6020*c*, and 6020*d* are arranged with respect to the primary facet 6010 such that the primary facet 6010 together with the secondary facets 6020*a*, 6020*b*, 6020*c*, and 6020*d* form faces of a truncated pyramid. In the embodiment shown in FIGS. 9A and 9B, the primary facet surmounts the truncated pyramid as shown in FIG. 9B.

FIG. 9B is a cross-sectional view of the augmented reality marker shown in FIG. 9A taken along a line as illustrated by the dashed line D-D in FIG. 9A. As can be seen from FIG. 9B, the primary facet 6010 surmounts the truncated pyramid (i.e. is at the top of the marker) and the secondary facets 6020*a* and 6020*c* form two faces of the truncated pyramid.

In some embodiments, the augmented reality marker 6000 also comprises a base which forms a bottom face of the truncated pyramid as illustrated in FIG. 9B. In this case, the truncated pyramid forms a closed volume. However, other embodiments of the marker shown in FIG. 9A do not have a base meaning that the truncated pyramid is open at the bottom.

In use, the marker 6000 is typically held by the user such that the primary facet 6010 faces towards the video camera 756. In some embodiments, a handle may also be attached to a side of the marker 6000 positioned opposite from the primary facet 6010 (i.e. on the reverse side of the primary facet 6010 or on the base 6030). This facilitates manipulation of the marker 6000 by the user.

By arranging one or more secondary facets so that they are not parallel with the primary facet 6010, the system unit 10 can cooperate with the video camera 756 so as to detect a tilt and pose of the augmented reality marker 6000 with respect to the camera 756 in a similar manner to that described above for the augmented reality marker 1000.

For example, if the secondary facet 6020*b* is slightly further away from the video camera than the secondary facet 6020*d* (i.e. the top of the marker 6000 is tilted towards the video camera 756), it may be difficult for the system unit 10 to determine whether the top of the marker 6000 is tilted towards or away from the camera if the symbol within the quad cannot be resolved sufficiently or the image on the primary facet 6010 has some degree of symmetry. Therefore, the cell processor 100 can compare the relative image sizes of image features corresponding to the secondary facets 6020*b* and 6020*d* so as to help resolve any ambiguity in tilt direction. The cell processor 100 can carry out similar image processing with respect to the secondary facets 6020*a* and 6020*c*. In other words, the cell processor 100 is operable to detect the relative distortions of the secondary facets 6020*a*, 6020*b*, 6020*c*, and 6020*d* so as to detect a relative orientation and tilt of the marker 6000 with respect to the video camera 756.

In some embodiments, the secondary facets 6020*a*, 6020*b*, 6020*c*, and 6020*d* are a different colour from the primary facet 6010. This helps distinguish the primary facet 6010 from the secondary facets 6020*a*, 6020*b*, 6020*c*, and 6020*d*. Additionally, in some embodiments, one or more of the secondary facets 6020*a*, 6020*b*, 6020*c*, and 6020*d* may have a different colour from each other. The cell processor 100 is operable to carry out colour detection on image features corresponding to the secondary facets 6020*a*, 6020*b*, 6020*c*, and 6020*d*. This further helps resolve any ambiguity as to the relative orientation of tilt of the marker 6000 with respect to the video camera 756.

It will be appreciated that in some embodiments, the marker 6000 may comprise the primary facet together with one or more secondary facets arranged so that the primary facet is nor parallel to the one or more secondary facets. For example, the marker could comprise the primary facet 6010 together with the secondary facet 6020*c* such that an angle between the primary facet 6010 and the secondary facet 6020*c* (denoted θ in FIG. 9B) is not equal to 90 degrees. In other words the primary facet is not parallel (where parallel means θ=180 degrees) to the secondary facet.

Preferably, where there are one or more facets each having a respective angle θ with respect to the primary facet, the angle θ lies in the range 180>θ≦90. However, it will be appreciated that the angle θ could be 90 degrees or less although this reduces the likelihood that the secondary facets can be used to resolve any tilt ambiguities. Additionally, it will be appreciated that each secondary facet could form a different respective angle with the primary facet and that the edges of the facets need not be contiguous with each other. Furthermore, the marker could be frustroconical, or the primary and secondary facets could be arranged to form any other suitable pyramidal frustrum.

It will be appreciated that the above described techniques may be combined as appropriate. For example, where more than one marker is used to define the virtual image plane and or the interaction area, one marker could be a three dimensional marker as described above with reference to FIG. 7, whilst other markers could be two dimensional.

It will be appreciated that in embodiments of the present invention, elements of the entertainment method may be implemented in the entertainment device in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

In conclusion, although a variety of embodiments have been described herein, these are provided by way of example only, and many variations and modifications on such embodiments will be apparent to the skilled person and fall within the scope of the present invention, which is defined by the appended claims and their equivalents.

What is claimed is:

1. An entertainment device for combining virtual images with real images captured by a video camera so as to generate augmented reality images, said device comprising:
   a receiver operable to receive a sequence of video images from said video camera via a communications link;
   a detector operable to detect an augmented reality marker within the received video images; and
   a processor operable to generate a virtual image plane in dependence upon the detection of said augmented reality marker by said detector, said virtual image plane being arranged to be substantially coplanar with a real surface upon which said augmented reality marker is placed so that virtual images may be generated with respect to said real surface,
   in which:
   said processor is operable to generate said virtual image plane within the captured video images, and to calibrate said virtual image plane to said augmented reality marker such that said virtual image plane is defined with respect to the detected augmented reality marker, said processor being operable to generate said virtual image plane such that, once said virtual image plane has been calibrated to said augmented reality marker, said augmented reality marker can be removed from a field of view of said camera while said virtual image plane remains for use during generation of augmented reality images; and
   said virtual image plane has an area which is greater than an area which corresponds to said augmented reality marker.

2. The entertainment device according to claim 1, in which said processor is operable to:
   detect a degree of distortion between a predetermined representation of said augmented reality marker and the detected augmented reality marker; and
   generate said virtual image plane in dependence upon the detected degree of distortion.

3. The entertainment device according to claim 1, in which said processor is operable to generate a virtual reality object at a virtual reality object position, said virtual reality object position being generated by said processor with reference to said virtual image plane.

4. The entertainment device according to claim 3, in which: said virtual image plane relates to an interaction area within said augmented reality images, said interaction area being a region of said captured images in which said virtual reality object may be displayed for interaction with a user;

said processor is operable to generate said interaction area in dependence upon said virtual image plane so that said virtual reality object can be displayed within said interaction area in combination with said real images captured by said video camera.

5. The entertainment device according to claim 4, in which said processor is operable to generate said interaction area so that a pixel area of said interaction area is a predetermined percentage of a full pixel area of said video camera.

6. The entertainment device according to claim 4, in which said processor is operable to:

detect, by analysis of said received video images, interaction area pixels which surround said augmented reality marker and are colour matched to within a predetermined colour threshold with respect to a colour of one or more pixels which are detected as being adjacent to pixels corresponding to said augmented reality marker; and generate said interaction area so that said interaction area corresponds to said detected interaction area pixels.

7. The entertainment device according to claim 4, in which:

said detector is operable to detect at least another augmented reality marker within said received video images; and said processor is operable to generate said interaction area so that at least part of a perimeter of said interaction area corresponds with the detected augmented reality markers.

8. The entertainment device according to claim 3, in which said virtual reality object is a virtual creature.

9. The entertainment device according to claim 1, in which:

said receiver is operable to receive said sequence of video images together with depth information generated by said video camera which relates to a distance between said video camera and said augmented reality marker; said detector is operable to detect, by analysis of said received video images and said received depth information, a three dimensional spatial position of said augmented reality marker with respect to said video camera; and said processor is operable to generate said virtual image plane within said captured video images such that said virtual image plane is defined with respect to said detected three dimensional spatial position of said augmented reality marker.

10. The entertainment device according to claim 3, in which:

said receiver is operable to receive said sequence of video images together with depth information generated by said video camera which relates to a distance between said video camera and said augmented reality marker;

said detector is operable to detect, by analysis of said received video images and said received depth information, a three dimensional spatial position of said augmented reality marker with respect to said video camera;

said processor is operable to generate said virtual image plane within said captured video images such that said virtual image plane is defined with respect to said detected three dimensional spatial position of said augmented reality marker; and said processor is operable to:

detect, in dependence upon said received depth information, whether said virtual reality object position is such that said virtual reality object is occluded from a point of view of said video camera by a real object; and generate said virtual object so that said virtual object appears to be behind said real object if said virtual reality object is occluded by said real object.

11. The entertainment device according to claim 1, in which said augmented reality marker is associated with a game feature of a game executed by said entertainment device.

12. The entertainment device according to claim 1, in which said detector is operable to detect said augmented reality marker within a single frame selected from said received video images in response to an indication that detection of said marker should be performed.

13. A system for combining virtual images with real images captured by a video camera so as to generate augmented reality images, said system comprising:

a video camera operable to capture video images of a real environment and generate depth information which relates to a distance between said video camera and an augmented reality marker; and an entertainment device according to claim 1.

14. A method of combining virtual images with real images captured by a video camera so as to generate augmented reality images, said method comprising:

receiving a sequence of video images from said video camera via a communications link;

detecting an augmented reality marker within said received video images;

generating a virtual image plane in dependence upon said detection of said augmented reality marker, said virtual image plane being arranged to be substantially coplanar with a real surface upon which said augmented reality marker is placed so that virtual images may be generated with respect to said real surface; and calibrating said virtual image plane to said augmented reality marker, in which:

said virtual image plane is generated within said captured video images, and said virtual image plane is calibrated to said augmented reality marker such that said virtual image plane is defined with respect to said detected augmented reality marker;

said virtual image plane is generated such that, once said virtual image plane has been calibrated to said augmented reality marker said virtual image plane to said augmented reality marker, said augmented reality marker can be removed from a field of view of said camera while said virtual image plane remains for use during generation of augmented reality images; and said virtual image plane has an area which is greater than an area which corresponds to said augmented reality marker.

15. A non-transitory computer-readable recording medium recorded with a computer program, the computer program, when executed by a processor, causing the processor to implement the method of claim 14.

* * * * *